United States Patent [19]
Rawson

[11] Patent Number: 5,640,914
[45] Date of Patent: Jun. 24, 1997

[54] DEBRIS MANIPULATING AND CLEARING ASSEMBLY FOR CLEARING CROP RESIDUE FROM SOIL

[75] Inventor: Ray Rawson, Farwell, Mich.

[73] Assignee: Unverferth Manufacturing Company, Inc., Kalida, Ohio

[21] Appl. No.: 418,148

[22] Filed: Apr. 5, 1995

[51] Int. Cl.[6] .................................................. A01C 5/06
[52] U.S. Cl. .................. 111/140; 111/163; 111/924; 172/31; 172/166; 172/184; 172/540; 172/624.5
[58] Field of Search ........................... 111/139, 140, 111/924, 167, 163, 121, 164; 172/31, 29, 166, 184, 540, 624.5

[56] References Cited

U.S. PATENT DOCUMENTS

| | | | |
|---|---|---|---|
| 4,377,979 | 3/1983 | Peterson et al. | 111/924 X |
| 4,550,122 | 10/1985 | David et al. | 111/140 X |
| 4,596,200 | 6/1986 | Gafford et al. | 111/140 X |
| 4,766,962 | 8/1988 | Frase | 172/624.5 |
| 4,785,890 | 11/1988 | Martin | 172/29 |
| 4,987,841 | 1/1991 | Rawson et al. | 111/121 |
| 5,161,472 | 11/1992 | Handy | 172/176 X |
| 5,163,518 | 11/1992 | Foley | 172/624.5 X |
| 5,333,694 | 8/1994 | Roggenbuck et al. | 172/156 |
| 5,341,754 | 8/1994 | Winterton | 111/139 |
| 5,349,911 | 9/1994 | Holst et al. | 111/139 |
| 5,394,946 | 3/1995 | Clifton et al. | 111/140 X |
| 5,413,056 | 5/1995 | Freed et al. | 111/924 X |
| 5,461,995 | 10/1995 | Winterton | 111/139 |
| 5,477,792 | 12/1995 | Bassett et al. | 111/139 X |

OTHER PUBLICATIONS

Yetter Manufacturing Co. "Fight Back" Brochure #1239-25 Sep. 1985.
*1993–1994 The Yetter Catalog*, p. 17, Yetter Manufacturing Company, Colchester, IL 62326-0358, USA.
*Move It*, p. 4, Yetter Manufacturing Company, Colchester, IL 62326-0358, USA.

*Primary Examiner*—Terry Lee Melius
*Assistant Examiner*—Christopher J. Novosad
*Attorney, Agent, or Firm*—Rothwell, Figg, Ernst & Kurz

[57] ABSTRACT

An apparatus and process for manipulating and clearing crop residue or other debris from a zone of soil before tilling the zone of soil to form a seedbed. The apparatus may be attached to the tool bar of a farm implement and includes a pair of fingered wheels which are rotated by the ground and manipulate the crop residue as the apparatus moves along the ground. A rotating coulter blade is disposed behind and between the wheels, and the wheels pull the residue rearward and press it against the soil surface where it is cut by the rotating coulter blade. The coulter blade cuts the residue into several portions at least some of which are thrown outward away from the zone of soil to be tilled. A zone tillage apparatus then tills, mixes, aerates and fertilizes the soil in the zone to form a fertilized seedbed, and a planter places seed in the seedbed, all of these procedures being carried out in one pass along the soil.

19 Claims, 9 Drawing Sheets

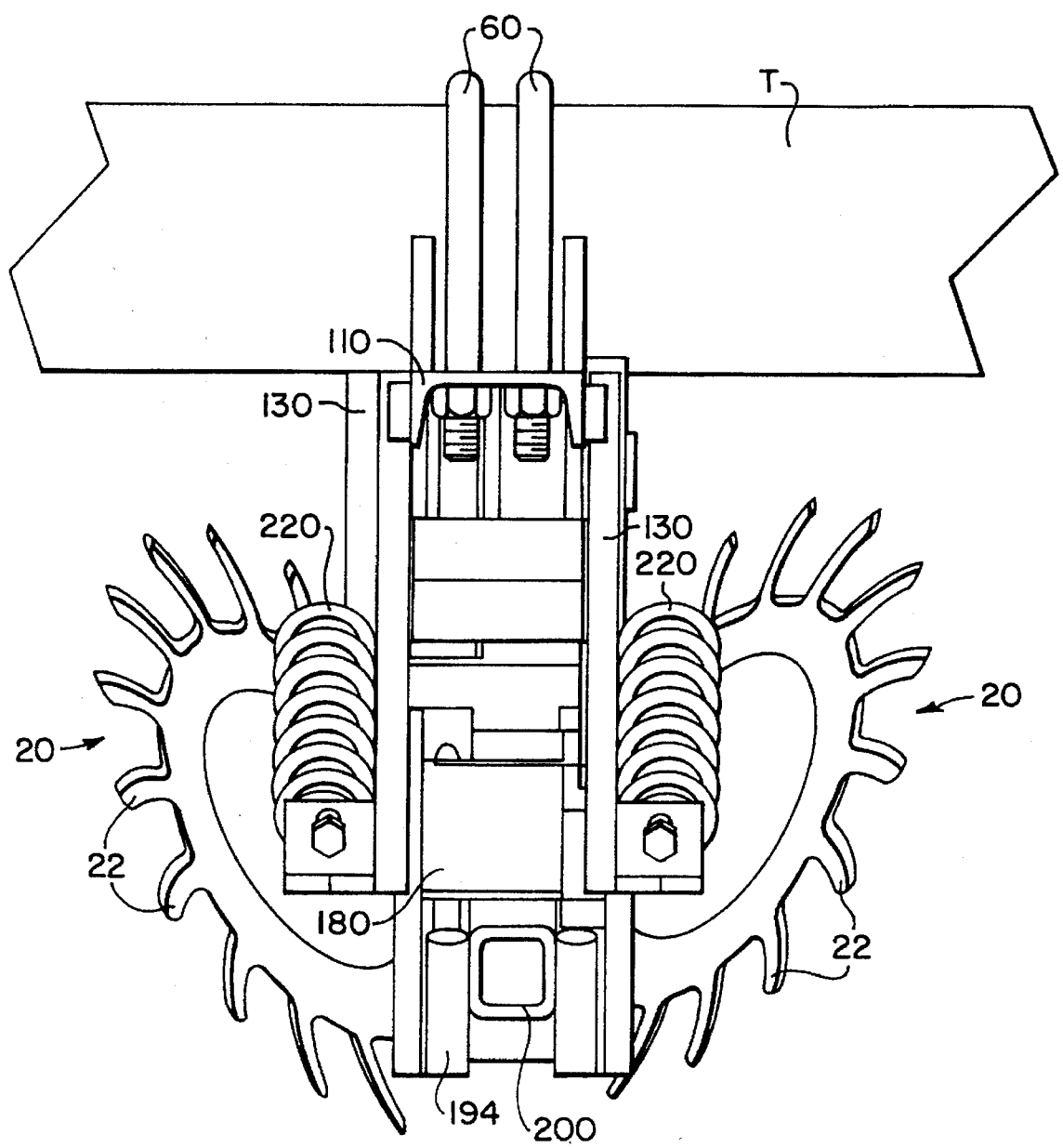

DEBRIS MANIPULATING AND CLEARING ASSEMBLY FOR CLEARING CROP RESIDUE FROM SOIL

BACKGROUND OF THE INVENTION

1. Field of the Invention

The present invention relates generally to apparatus for preparing an area of soil for planting, and more particularly, apparatus for manipulating and removing at least some of the debris, for example, crop residue or trash, from the area of soil being prepared for planting.

2. Description of Related Art

There are several ways in which farm land covered with crop residue is prepared for planting or seeding. In the past, the land was turned over by a plow, cut by disks, pulverized by a harrow, etc. However, preparing the soil in this manner is less desirable or unacceptable in some circumstances due to erosion problems caused by use of the above apparatus, particularly such use on contoured land. Thus, there has been significant interest in "low-till" and "no-till" farming, which, rather than turning over and tilling an entire field, tills only spaced strips of soil. This method of soil preparation reduces the damaging effects of erosion on the soil.

The strips of soil are tilled by tools which penetrate the surface of the soil and form a seedbed area for planting. The apparatus may use rotatable coulter wheels or disks to cut and mix the soil followed by a penetrating blade for additional cultivation of the soil. In addition, apparatus for penetrating the soil hardpan to form a passage therein beneath the seedbed may be used as well. The tillage apparatus may be followed by a planter or drill which places seed in the seedbed prepared along each strip of soil.

As mentioned above, because turning over the soil in an entire residue-laden field may create serious erosion problems, it is desirable to have some of the crop residue remain on the soil surface after planting. However, the crop residue may cause problems in tilling the strips of soil by becoming caught or stuck in the tillage apparatus and interfering with mixing of the soil. This is known in the art as plugging or rapping. Further, the adverse effects of mixing excessive crop residue in the soil forming the seedbed are well known in the art. For example, see U.S. Pat. No. 5,333,694 which discloses a strip till seedbed preparation apparatus which removes some of the crop residue. While the coulter disks of such known tillage apparatus may be sufficient to remove a limited amount of crop residue from the planting area, excessive mixing of residue in the seedbed still occurs and may adversely affect the tilled soil.

Accordingly, there is a need in the art for an improved apparatus for removing or clearing crop residue from the soil to prevent mixing of an excessive amount of such residue in the seedbed.

SUMMARY OF THE INVENTION

The present invention provides a debris manipulating and clearing assembly for use in removing or clearing debris or crop residue, i.e., roots, harvested crop, trash, etc., from the soil before tilling and mixing the soil to form a seedbed. The assembly includes a bracket for being mounted on the tool bar of a farm implement, and the assembly may be followed by a zone tillage apparatus and a planter or seed drill. The debris manipulating assembly includes a pair of rotating fingered wheels which grab and pull crop residue rearward to the space between the wheels and presses the residue where it is cut by a rotating coulter disk. The wheels press the residue against the ground so that it is taut and easily cut by the coulter disk. The fingered wheels and coulter disk are mounted on the assembly via a parallel bar linkage which secures the components together and prevents twisting of the assembly about the tool bar of the farm implement to which it is secured. The parallel linkage also permits the components to move together vertically, with springs being provided to forcibly bias the wheels and coulter disk toward the soil. This assures that the assembly maintains a constant position relative to the ground while following the contour of the ground over various terrain. The wheels and disk are adjustable with respect to the tool bar and the biasing force applied by the springs can be adjusted as well and set to a desired amount.

The assembly is adapted to be mounted on the tool bar of a farm implement so as to clear at least some of the residue from the area or zone of soil which will subsequently be tilled and mixed to prepare a seed bed. The residue is manipulated by the fingered wheels and cut by the coulter disk so as to be thrown outward. The tillage apparatus mixes and aerates the soil and may apply fertilizer to the soil to form a fertilized seedbed. The planter or drill then places seed in the seedbed to complete the residue clearing, zone tilling and planting operations in a single pass through the field. A process of clearing crop residue from an area or zone of soil includes steps of manipulating the residue to pull it into a rotating coulter disk which cuts the residue, and then throwing at least some of the residue outward away from the zone of soil which will be tilled and mixed to form a seedbed.

BRIEF DESCRIPTION OF THE DRAWINGS

Other features, benefits and advantages of the present invention will be apparent from the following description of preferred embodiments thereof, taken in conjunction with the accompanying drawing Figures, wherein:

FIG. 3 is a plan view of the assembly shown in FIGS. 1 and 2;

DETAILED DESCRIPTION OF PREFERRED EMBODIMENTS

Figure 1:
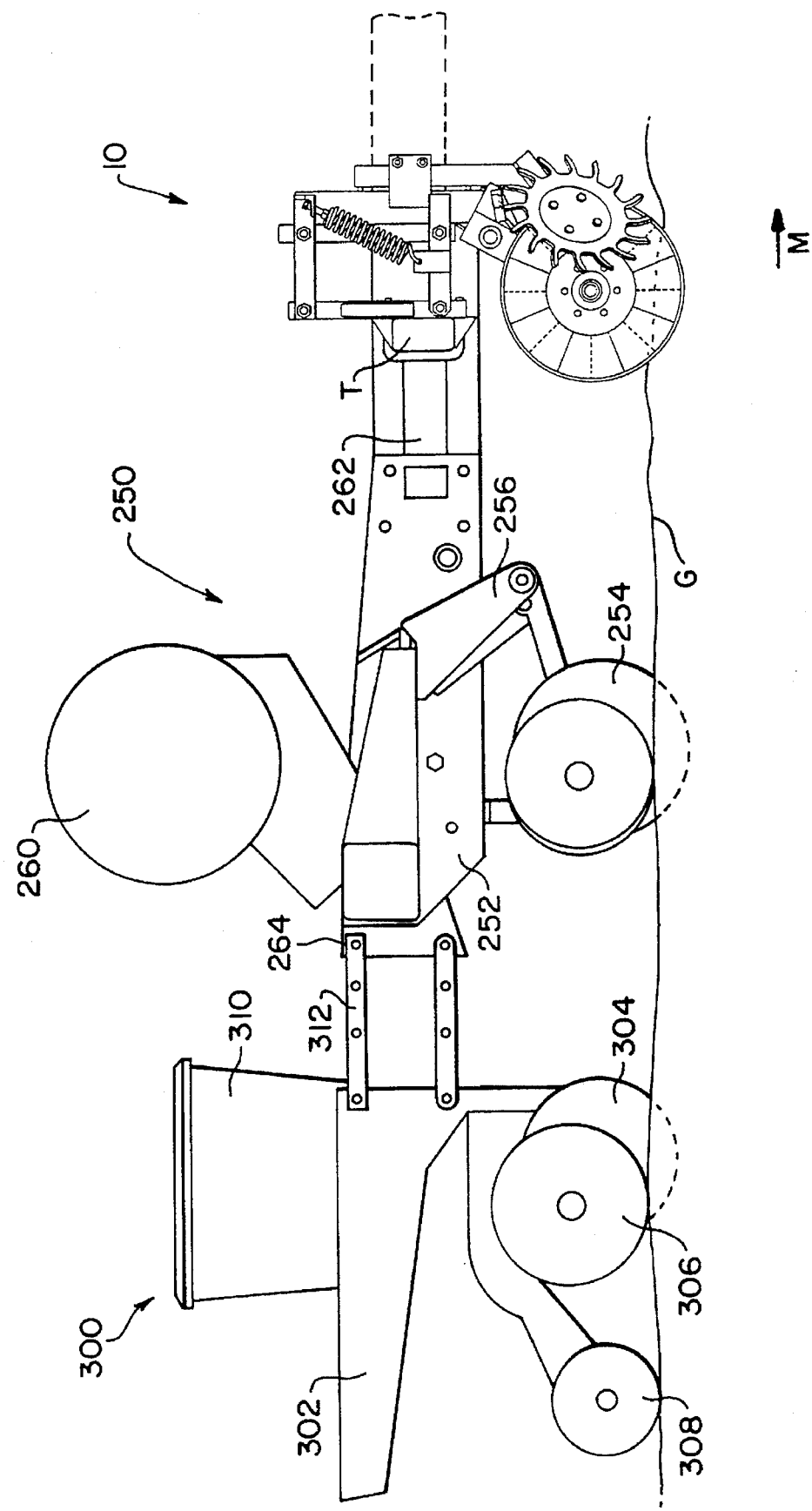
FIG. 1 is an side elevation view showing in schematic fashion a crop residue manipulating and clearing assembly in combination with a tillage apparatus and a planter according to one embodiment of the present invention.

FIG. 1 is a schematic view of a debris manipulating and clearing assembly 10 according to a preferred embodiment of the present invention for clearing and removing crop residue or other debris from a selected zone or row of soil before the soil is tilled to form a seedbed. The assembly 10 is shown in combination with a zone tillage apparatus 250 which includes a support frame 252 and a plurality of laterally spaced coulter units each of which tills a zone of soil and has, for example, three coulter disks or blades 254 secured to the frame 252 via arms 256 which are spring biased toward the ground. The coulters 254 preferably have flutes and dig or cut into the soil below ground line G as seen in FIG. 1 and turn over, mix and aerate the soil zone as the tillage apparatus is moved along the ground so that the soil in the seedbed warms and dries quickly. The tillage apparatus 250 includes one or more supply tanks 260 for storing fertilizer (either liquid, dry or both) which is placed in the seedbed formed from the soil which is tilled by the coulters 254. As explained below, the debris manipulating and clearing assembly 10 removes all or some of the crop residue from the zone before the tillage apparatus tills the soil in the zone to form a seedbed.

The tillage apparatus 250 includes a first attachment structure indicated at 262 (which may include a tool bar) for attaching the rear of the debris cleaning assembly 10 to the apparatus 250, and a second attachment structure indicated at 264 (which may also include a tool bar) for attaching the apparatus 250 to the front of a planter or grain drill 300. Planter 300 may be conventional and includes a planter body 302, seed opening disks 304 for forming an opening in the seedbed prepared by apparatus 250, closing disks 306 for closing the opening after the seed (contained in supply container 310) has been placed therein, and firming wheels 308 for firming the soil in the seedbed. The planter 300 has an attachment structure, for example bars 312, for attaching the planter to the tool bar of the tillage apparatus 250.

In operation, the combination shown in FIG. 1 is moved through a field in the direction of arrow M in FIG. 1 (by a tractor or the like) and the debris cleaning assembly 10 removes crop residue from the row or zone of soil being contacted by the assembly, as described in detail below. The tillage apparatus 250 tills the soil in the zone after the assembly 10 has removed at least some of the crop residue or other debris from the zone to form a mounded seedbed which warms and dries quickly, and apparatus 250 applies fertilizer to the seedbed, which may be liquid and/or dry fertilizer, for example, liquid nitrogen, potash, phosphate, etc. The result is a fertilized seedbed that does not have an excessive amount of crop residue mixed therein. The planter or seed drill then places seed in the fertilized seedbed as is known in the art. Thus, in one pass through the field, the previously residue-laden zone of soil has been cleared of debris, formed into a fertilized seedbed, and seed has been planted therein.

Figure 2:
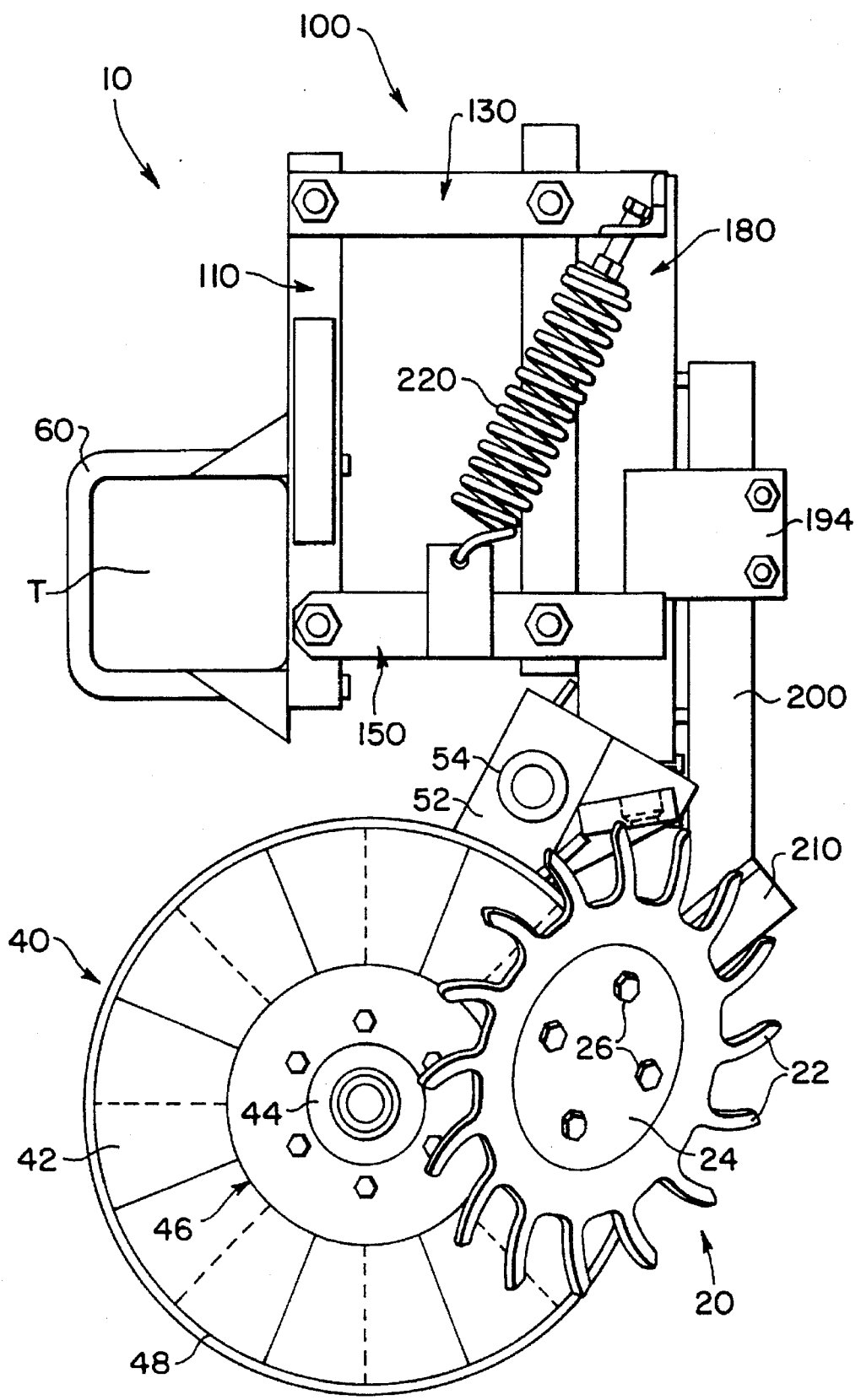
FIG. 2 is side elevation view of the residue manipulating and clearing assembly shown in FIG. 1.

The debris manipulating and cleaning assembly 10 is capable of removing very dense or massive amounts of residue or trash which cover the soil to prevent such residue from being mixed or incorporated into the seedbed. The assembly 10 is shown in FIGS. 2 and 3 and comprises a pair of ground-driven rotating wheels 20 with fingers or projections 22 extending from the periphery thereof, a coulter blade 40, and a parallel bar linkage indicated at reference numeral 100. The parallel bar linkage 100 is mounted to a tool bar T by any suitable means which, in a preferred embodiment, is a pair of U-shaped brackets 60 which receive the tool bar, the brackets 60 having threaded ends 62 which are fastened to the parallel bar linkage 100 via locking nuts (as seen in FIG. 3). As seen in FIG. 1, the tool bar is affixed to the tillage apparatus 250 and the assembly 10 is disposed in front of apparatus 250 so as to precede same in moving through the field. As will be described below, the assembly 10 is mounted to the tool bar T so as to be movable in a vertical direction toward or away from the ground but is prevented from twisting relative the tool bar.

Figure 5:
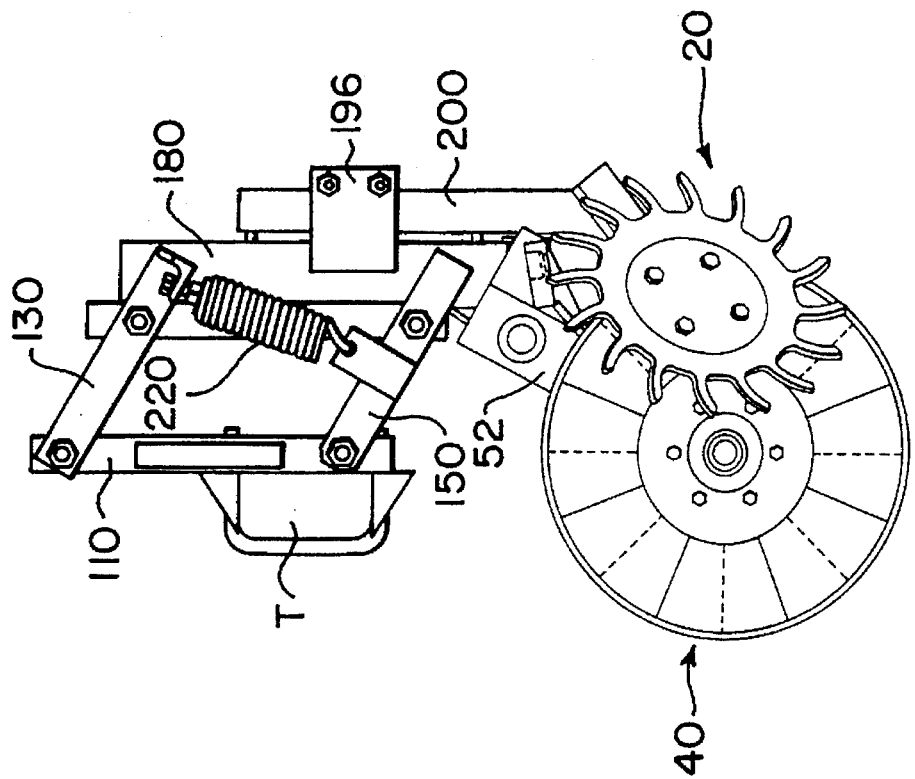
FIG. 5 is a side elevation view of the assembly shown in FIGS. 1–3 in its lowest position.
Figure 4:
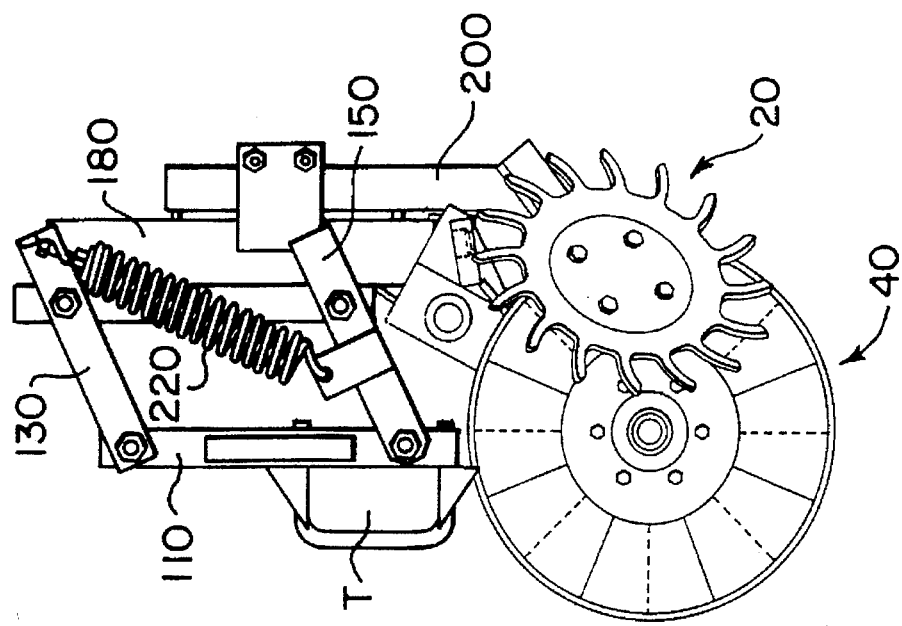
FIG. 4 is a side elevation view of the assembly shown in FIGS. 1–3 in its maximum raised position.

The parallel bar linkage 100 may take various forms and may be configured in various manners so as to provide torsional stiffness to the assembly relative to the tool bar of the implement to which it is secured. In a preferred embodiment, the linkage 100 includes four main components, a rear vertical mounting bracket 110, an upper link member 130, a lower link member 150, and a front vertical tube member 180. These four components are secured to each other so as to permit pivoting of the upper link 130, lower link 150, and front tube member 180 relative the rear vertical mounting bracket 110, the mounting bracket 110 being fixed to the tool bar T as seen in FIGS. 2 and 3. FIGS. 4 and 5 show the parallel bar linkage 100 pivoted about the rear bracket 110 and tool bar T to, respectively, the maximum raised and lowered positions.

Figure 6A:
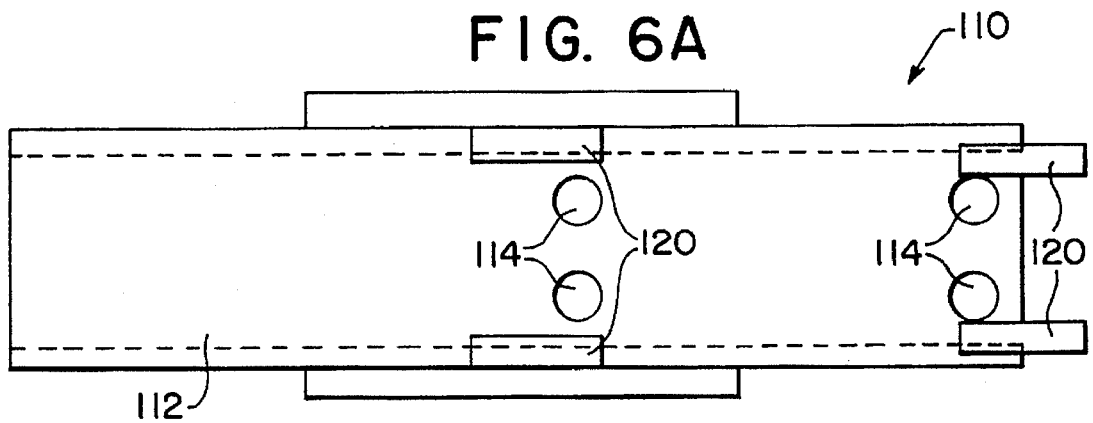
FIGS. 6A–6C are, respectively, front and side elevation views and a plan view of a rear mounting bracket of the assembly shown in FIGS. 1–5.
Figure 6B:
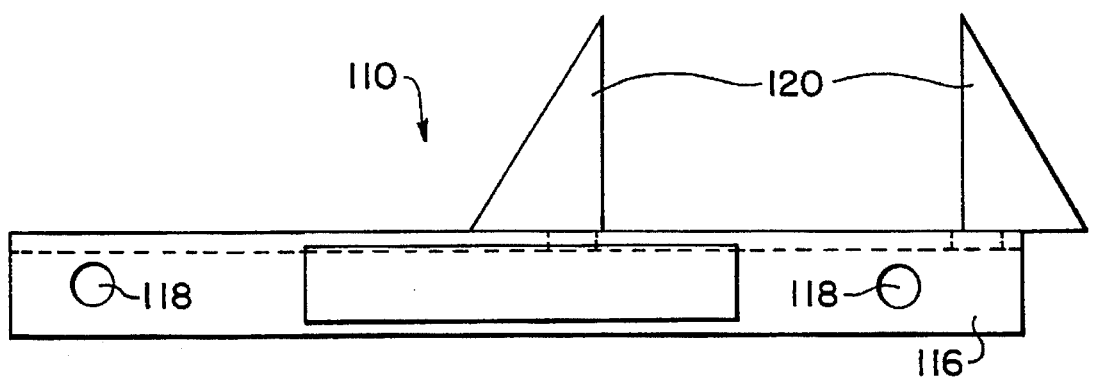
Figure 6C:
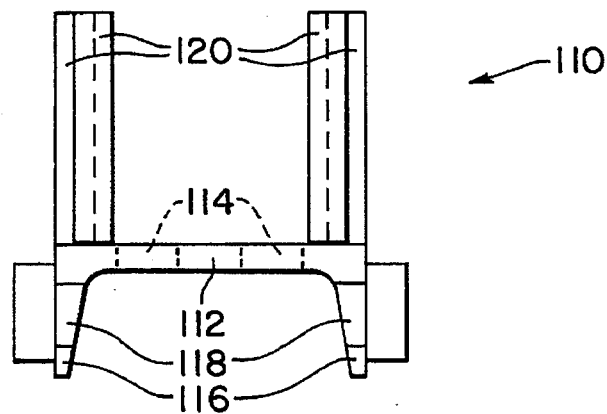

The rear mounting bracket 110 is shown in FIGS. 6A–6C and is in the form of a channel member with a base 112 and legs 116 extending away from the base 112. The base 112 is provided with apertures 114 for receiving the ends of the U-shaped brackets 60 so as to mount the assembly 10 to the tool bar T. A pair of projections 120, which may be welded to bracket 110, extend away from the base 12 opposite the legs 116 and engage opposite sides of the tool bar T (as seen in FIG. 2). The legs 116 of bracket 110 have upper and lower ends with openings 118 passing therethrough for receiving fasteners which pivotally secure the rear bracket member 110 to upper and lower link members 130 and 150 in any suitable fashion.

Figure 7A:
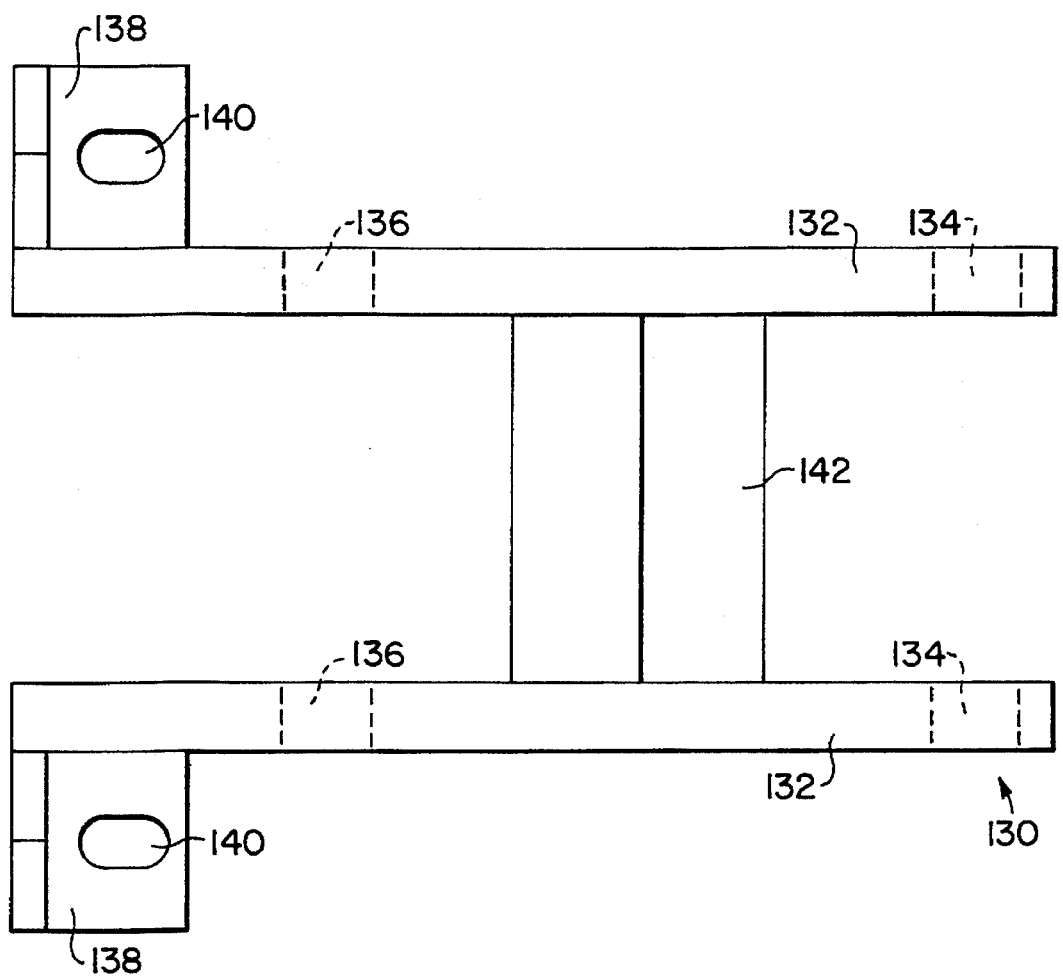
FIGS. 7A and 7B are, respectively, a plan view and a side elevation view of an upper link member of the assembly shown in FIGS. 1–5.
Figure 7B:
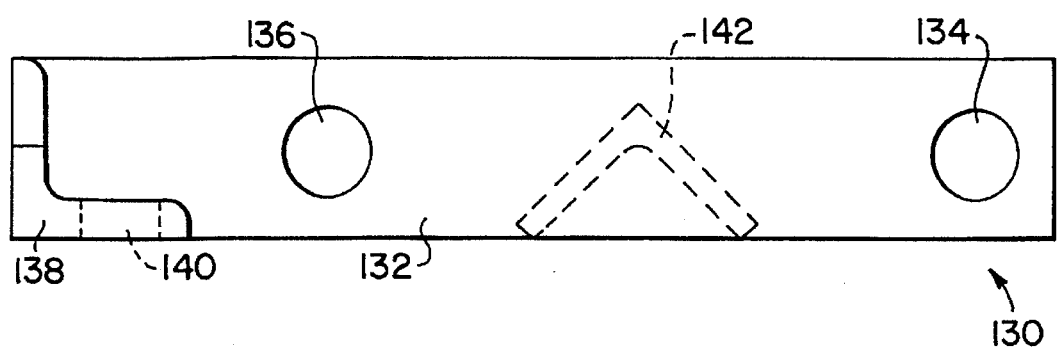

Upper link member 130 of parallel bar linkage 100 is shown in FIGS. 7A and 7B and comprises a pair of laterally extending bars 132 secured to each other by a cross brace, for example, a V-shaped cross brace 142 which is welded thereto. The bars 132 have a first end with openings 134 passing therethrough for receiving fasteners which pass through openings 118 of rear bracket 110 to pivotally connect the bars 132 to the upper portions of the legs 116 of rear bracket 110. The bars 132 have a second end with openings 136 for receiving fasteners as discussed below. A pair of angles 138 are secured, for example by welding, to the second end of the bars 132 and include an opening 140 for securing a first end of the springs 220 as discussed below.

Figure 8A:
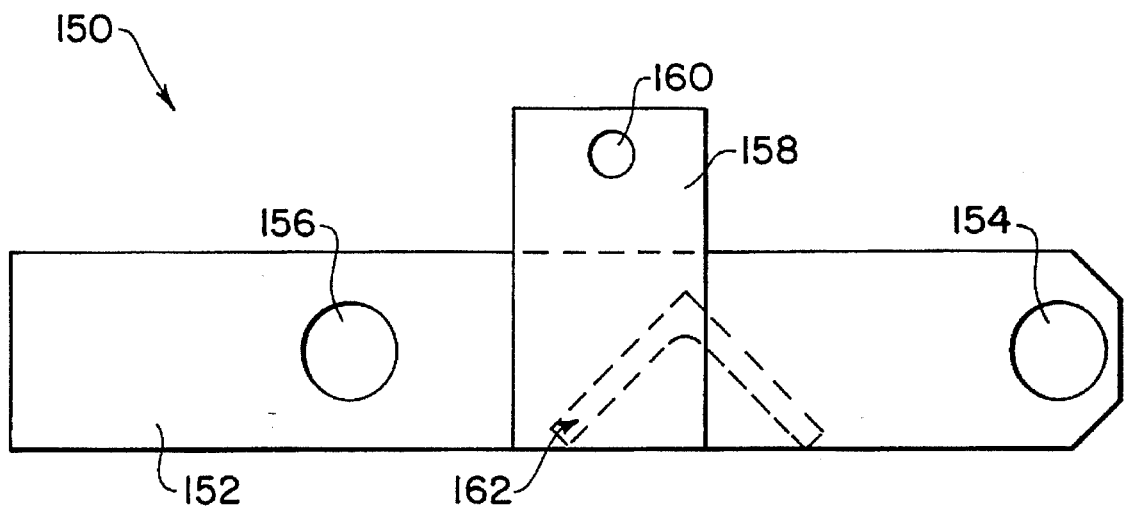
FIGS. 8A and 8B are, respectively, side and front elevation views of a lower link member of the assembly shown in FIGS. 1–5.
Figure 8B:
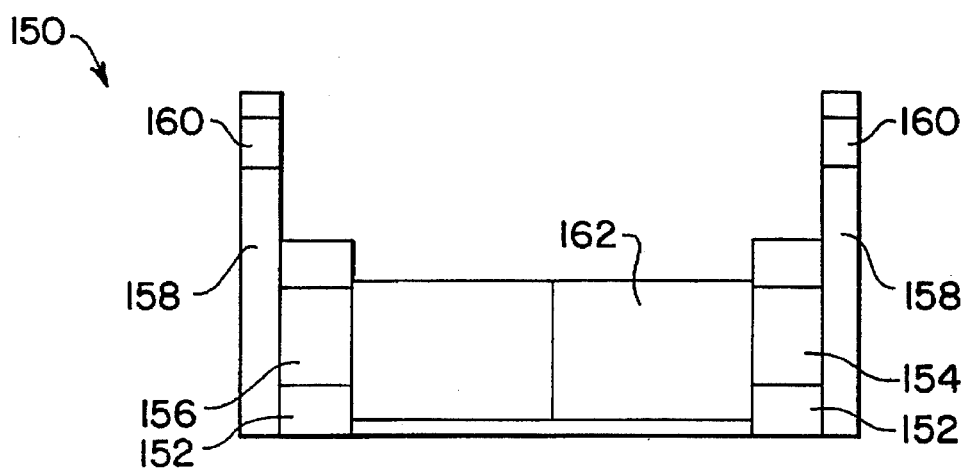

Lower link member 150 of parallel bar linkage 100 is shown in FIGS. 8A and 8B and includes a pair of laterally extending bars 152 connected together by a cross brace 162, which may take the form of the cross brace 142 of upper link member 130. The bars 152 have a first end with an opening 154 for receiving fasteners which pass through openings 118 of rear bracket 110 to pivotally connect the bars 152 to the lower portions of the legs 116 of rear bracket 110. The bars 152 have a second end with openings 156 for receiving fasteners as discussed below. A pair of brackets or flanges 158 are secured, for example by welding, to the bars 132 and have an opening 160 for securing a second end of the springs 220 as discussed below.

Figure 9A:
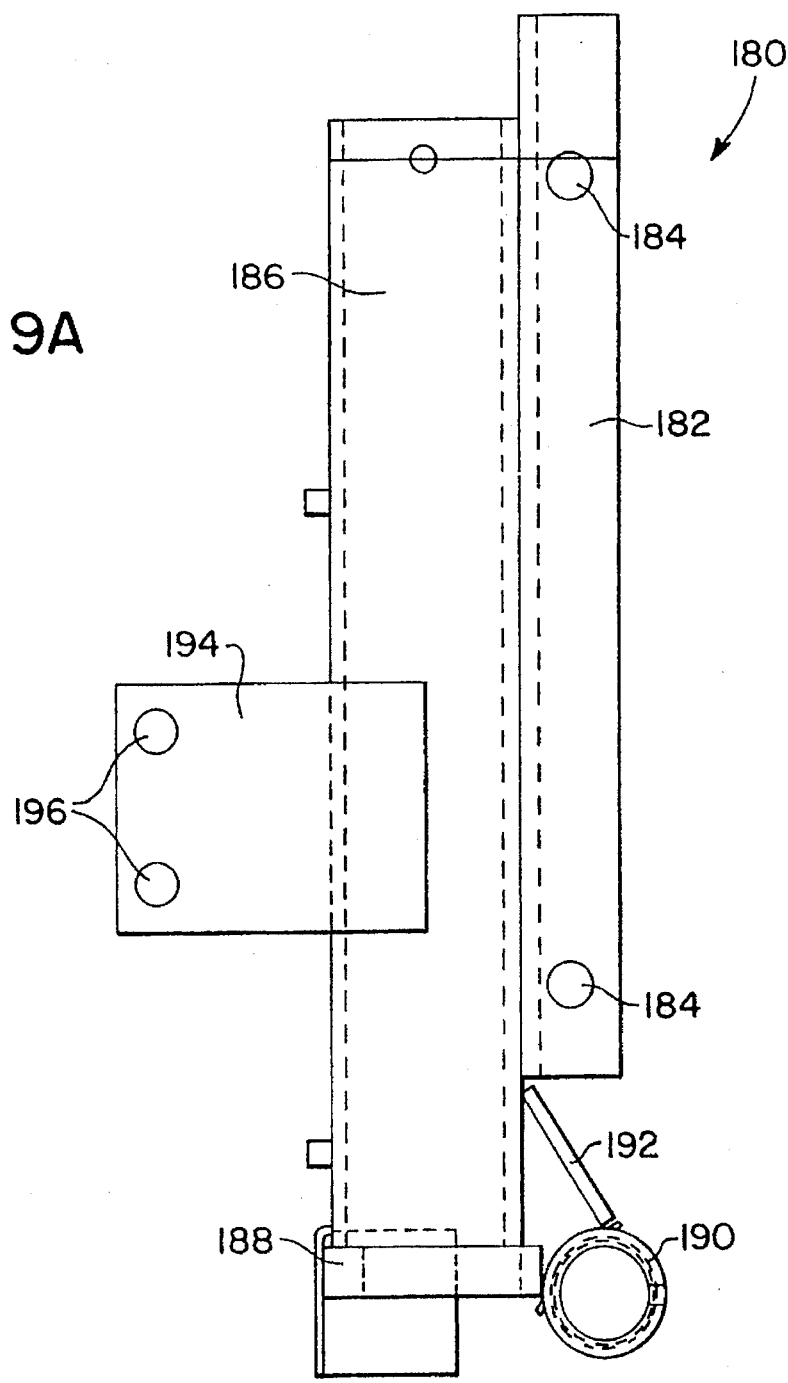
FIGS. 9A and 9B are, respectively, a side elevation view and a plan view of a front vertical tube member of the assembly shown in FIGS. 1–5.
Figure 9B:
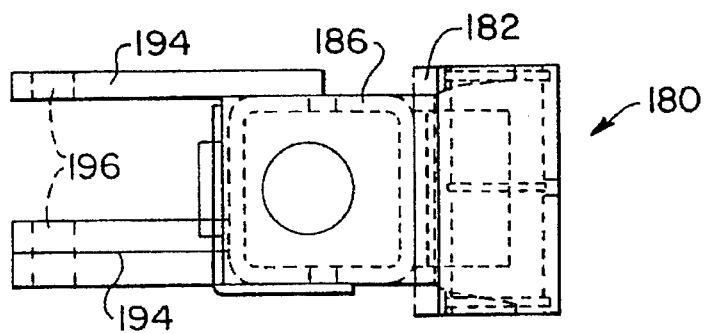

The fourth component of the parallel bar linkage 100 is a front vertical tube 180 (shown in FIGS. 9A and 9B) which comprises a tube 186 with a channel member 182 secured thereto, for example by welding. As seen in FIG. 9B, the channel 182 has a base and legs and is similar to the channel rear bracket 110 (except that it opens in an opposite direction). The channel 180 has upper and lower ends with openings 184 passing therethrough, which openings are aligned, respectively, with the openings 134 and 154 of upper and lower link members 130 and 150, and fasteners pass through the openings and pivotally secure the components together. The tube 186 of front vertical tube 180 has a base 188 with a bushing 190 secured thereto and a plate also secures the bushing 190 to the tube 186, for example by welding. The bushing 190 is received in an opening in the mounting arm 52 of coulter blade 40 to pivotally mount the coulter relative the parallel bar linkage 100. In addition, although not necessary with the present invention because of springs 220 which bias the coulter blade 40 and wheels 22 toward the ground, the tube 186 could house another spring which biases the coulter arm 53 toward the ground.

The tube 186 has secured thereto, preferably by welding, bracket arms 194 which are provided with apertures 196 that receive suitable fasteners to secure the mounting arm 200 of fingered wheels 20 to the parallel arm linkage 100. The mounting arm 200 (FIGS. 10A and 10B) includes a vertical tube member 202 with an upper end 204 and a lower end 206. The tube member 202 is positioned within the bracket arms 194 and clamped thereto. A spindle mounting member 210 is rigidly secured to the tube 202 near the lower end 206 thereof by any suitable means and extends away from the tube 202 at an angle relative thereto. The spindle mounting member 210 includes two bars 212 each of which is provided with an opening 214 for receiving the spindles (not shown) of the rotating wheels 20. The spindles of the wheels 20 include a first component secured to the center 24 of the wheel 20 and a second component rotatable relative the first component via bearings. The first component of each spindle is secured to the center 24 of the wheels 20 via bolts 26 and the second component is secured to the bars 212. The fingered wheels 20 rotate relative the mounting member 210 as the assembly moves along the ground. Those skilled in the art will recognize that any other suitable rotatable mounting means could be utilized to secure the wheels 20 to the spindle mounting member 210.

Figure 10A:
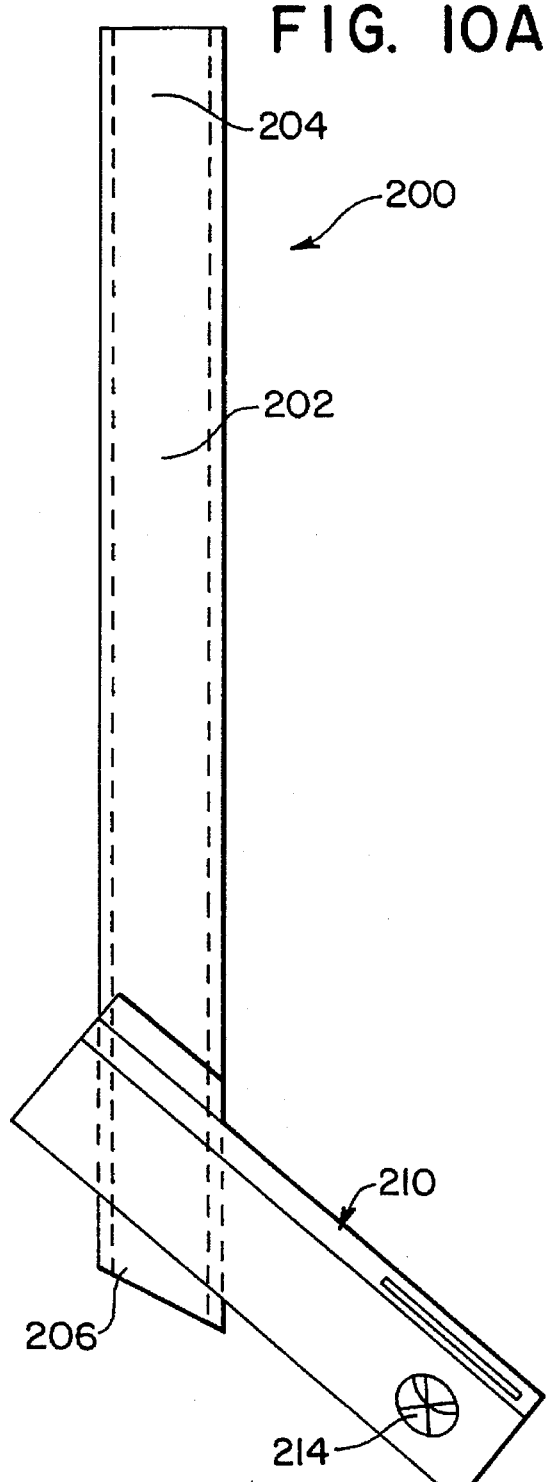
FIGS. 10A and 10B are, respectively, side and front elevation views of a mounting arm of the assembly shown in FIGS. 1–5.
Figure 10B:
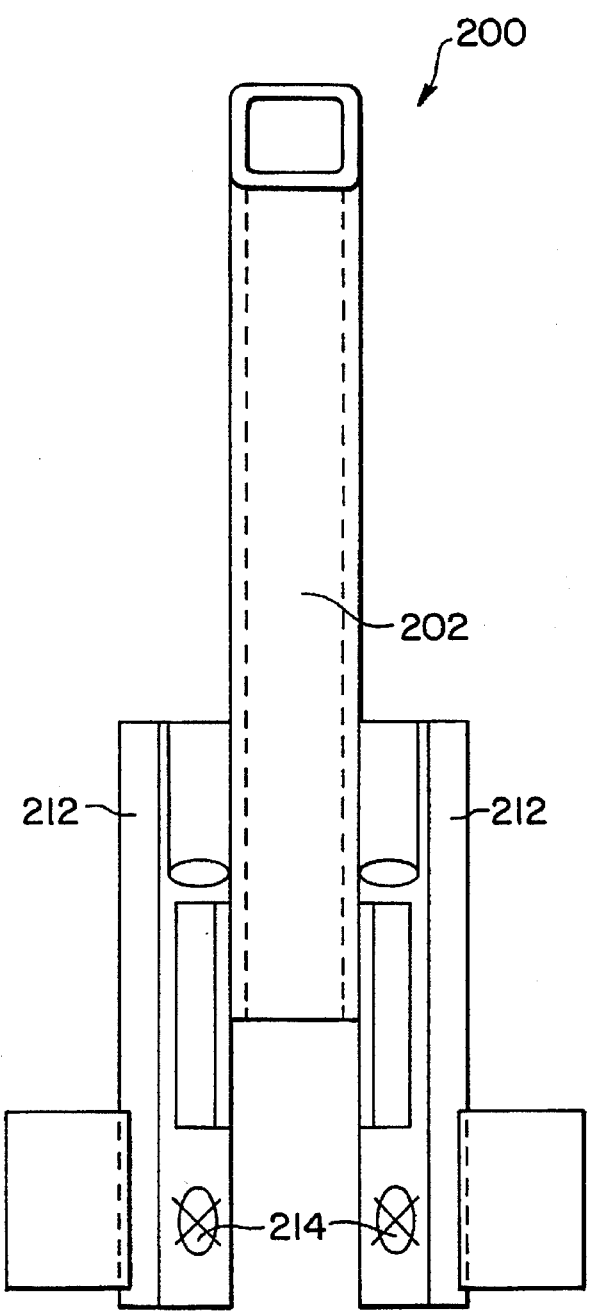

The bars 212 of spindle mounting member 210 are angled outward from the sides of tube 202 as seen in FIGS. 10A and 10B such that the wheels 20 are oriented in an angular fashion. In particular, the wheels 20 form a V-shape with the apex of the V adjacent the surface of the soil and the wide portion of the V disposed away from the soil. This configuration, in combination with the relative positioning of the wheels and coulter, causes the fingers 22 of rotating wheels 20 to manipulate and press the residue against the ground and rearward toward the coulter blade 40. The position of the wheels 20, of course, may be varied and the angular orientation thereof altered for different applications. The wheels 20 are preferably positioned slightly ahead of the forward end 48 of coulter blade 40, e.g., several inches, so that the residue is grabbed and pulled rearward by the wheels and pressed taut against the ground where it is substantially simultaneously cut by the edge 48 of coulter blade 40, as explained below. The position of the wheels 20 relative to the parallel bar linkage 100 (and the coulter blade 40) can be easily adjusted by sliding the tube 202 of mounting arm 200 in the bracket 194 of front vertical tube member 180 and clamping the former at a desired position.

As explained above, the parallel arm linkage 100 secures the rotating wheels 20 and the rotating coulter blade 40 to the tool bar T of a farm implement to permit movement of the wheels 20 and coulter 40 toward or away from the ground, thus allowing the assembly 10 to follow the contour of the ground, while preventing twisting of the assembly with respect to the tool bar. Springs 220 are provided to bias the entire parallel bar linkage assembly 100 toward the ground, the normal biased position being shown in FIG. 5. Thus, if the assembly 10 is not contacting the ground, the wheels 20 and coulter 40 are biased all the way down so as to assume the position shown in FIG. 5 (with the springs 220 fully collapsed). However, in operation, when the wheels 20 and coulter 40 are actually engaging the ground, the parallel bar linkage is moved to a position similar to that shown in FIG. 2 with the upper link 130 generally horizontal. Although biased downward by the springs 220, the ground forces the wheels 20 and coulter 40 upward to a position such as that shown in FIG. 2. Further, although forced slightly upward by the ground, the wheels 20 and coulter 40 are forcibly biased into contact with the ground to readily clear and remove the debris from the soil. When the assembly 10 is moved over a higher contour land area, the parallel bar linkage 100 is free to move upward (against the force of springs 220) to the maximum raised position shown in FIG. 4, while the depth of penetration of coulter blade 40 in the soil is maintained substantially constant, as described below.

As noted above, a significant benefit of the present invention is the ability of the assembly 10 to follow the contour of the ground over which it is moved. The coulter blade 40 of the assembly is provided with a depth band 46 which engages and rides along the surface of the soil (as seen in FIG. 1). The depth band 46 controls the depth that the fluted body 42 of coulter blade 40 penetrates the soil as further penetration of the blade is prevented when the depth band 46 contacts the soil surface. Thus, very controlled debris removal and clearing of the soil can be obtained for any given application with the coulter blade achieving a constant depth of penetration due to the depth band 46. In addition, the amount of force applied by the springs 220 to the wheels 20 and coulter 40 via the parallel bar linkage 100 can be set to a desired value, for example, by choosing a spring with a suitable spring constant, length, etc., so as to apply a desired amount of biasing force to the coulter blade 40 and wheels 20.

In operation, the debris manipulating and clearing assembly 10 is positioned on the surface of the soil with the springs 220 forcibly biasing the coulter blade 40 into the ground and fingered wheels 20 toward the ground. The assembly 10 is driven or moved by way of its attachment to the tool bar T of any suitable farm implement, which in FIG. 1 is a zone tillage apparatus 250 (which itself is connected to the three point hookup of a tractor or the like—not shown). Thus, in the embodiment of FIG. 1, the tractor drives the tillage apparatus, the debris manipulating and clearing assembly 10, and the planter 300.

As the assembly 10 moves along the ground, the fingers 22 of wheels 20 rotate and manipulate the crop residue or other trash located on the surface of the soil. In FIG. 1, as the assembly 10 is moved in the direction of arrow M, the wheels 20 rotate clockwise (as viewed in FIGS. 1, 2, 4 and 5). The orientation of the wheels causes the residue to be pulled rearward toward the coulter blade 40. Due to the relative positioning of the wheels 20 and coulter blade 40, the residue which is grabbed and pulled rearward is pressed taut against the surface of the soil by the wheels and is substantially simultaneously and easily cut into portions by the rotating coulter blade 40. The rotation of the wheels throws at least some of the cut portions of residue outward away from the zone of soil being cleared of debris or trash. In a preferred embodiment, the coulter blade is slightly behind the fingered wheels, for example, from one to three inches behind. As such, the tillage apparatus does not mix or incorporate an excessive amount of crop residue—a limited amount being acceptable—with the tilled, mixed and aerated soil that is formed into a seedbed.

It is apparent that the present invention provides an apparatus and process for manipulating and removing or clearing crop residue or other debris from the soil to prevent an excessive amount of residue being mixed in with the soil which is formed into a seedbed. Also, the apparatus of the invention is extremely rugged and is suitable for use in many different geographic areas with various terrain or soil types. Further, the apparatus is adjustable in several respects to facilitate its use in many different applications. Finally, the apparatus is easy to use and can be combined with other apparatus to provide a system which can clear debris from the soil, till and fertilize the cleared zone of soil to form a fertilized seedbed, and place seed in the seedbed all in one pass through the field.

While the present invention and the embodiments presented herein have been set forth and described in detail for the purposes of making a full and complete disclosure of the subject matter thereof, such disclosure is not intended to be limiting in any way with respect to the true scope of this invention as the same is set forth in the appended claims.

What is claimed is:

1. An agricultural apparatus comprising an assembly for manipulating and clearing crop residue from soil in a planting zone of ground having a contour, the assembly comprising:

a support frame for being secured to a tool bar of a farm implement;

a pair of rotatable ground-driven wheels mounted on the frame and movable in a substantially vertical direction relative to the frame, the rotatable wheels being mounted on the frame in an angled orientation with the wheels converging toward each other adjacent the ground for manipulating crop residue in an area located between the pair of rotatable wheels, each of said wheels having a plurality of fingers disposed about the periphery of the wheel for manipulating the residue in said area; and a rotatable coulter blade mounted on the frame and movable in a substantially vertical direction relative to the frame, the coulter blade having a cutting edge disposed between the pair of rotatable wheels for cutting the residue that is manipulated by the pair of rotatable wheels in said area into separate portions;

whereby at least some of the separate residue portions are thrown outward away from the coulter blade to remove at least some of the residue from said area as the assembly moves along the soil; and an attachment member for connecting said assembly to a seed planter device for planting seed in the ground so that said assembly moves alternately toward and away from the ground and follows the contour of the ground independently of said seed planting device.

2. An apparatus as claimed in claim 1, wherein the pair of rotatable wheels are each mounted on the frame so as to extend forwardly of the coulter blade a predetermined distance wherein the wheels press the residue taut against the surface of the soil and the blade cuts the residue located between the wheels substantially immediately after the wheels press the residue against the soil surface.

3. An apparatus as claimed in claim 1, wherein the support frame has means for mounting the assembly on a tool bar of said apparatus.

4. An apparatus as claimed in claim 1, wherein the support frame includes a parallel bar linkage to which the pair of rotatable wheels and coulter blade are secured which permits the wheels and coulter blade to be moved in said substantially vertical direction toward or away from the soil, and springs for biasing the rotatable wheels and the coulter blade toward the soil in a generally downward direction.

5. An apparatus as claimed in claim 4, wherein the parallel bar linkage includes a rear bracket member for being secured to the tool bar, an upper link member secured to a top of the channel member, a lower link member secured to a bottom of the channel member, and a front mounting bar secured to the upper link member and lower link member so as to be substantially parallel to the rear bracket member, and the wheels and coulter blade are secured to the front mounting bar, wherein the upper link member, the lower link member, and the front mounting bar are movable together in a vertical direction relative to the rear bracket member to move the wheels and coulter blade toward or away from the soil.

6. An apparatus as claimed in claim 4, wherein the springs for biasing the rotatable wheels and coulter blade toward the soil are adjustable for applying a pre-selected biasing force to the wheels and the coulter blade.

7. An apparatus as claimed in claim 1, wherein the coulter blade is provided with a depth band which contacts and follows the surface of the soil to control the depth that the coulter blade penetrates the soil.

8. The apparatus of claim 1, further comprising said seed planter device.

9. The apparatus of claim 8, wherein said seed planter device is connected to said assembly so as to be positioned behind said assembly when said agricultural apparatus moves over the soil.

10. The apparatus of claim 9, further including a soil tilling apparatus, wherein said tilling apparatus is connected to said assembly so as to be positioned between said assembly and said planter device when said agricultural apparatus moves along the soil.

11. An agricultural apparatus comprising a debris manipulating and clearing assembly for use in removing debris from an area of soil to be prepared for planting, the assembly adapted to be attached to a farm implement and comprising:

a support frame for being attached to a farm implement which is driven along the soil;

first and second fingered wheels rotatably mounted on the support frame and including a plurality of projecting fingers for grabbing and manipulating plant debris as the assembly is moved along the soil, the first and second wheels being spaced apart a desired distance and angled toward each other to substantially form a V-shape, the legs of which open upwardly and the apex of which is disposed adjacent the soil;

a coulter blade rotatably mounted on the frame and having a cutting edge disposed between and slightly behind the first and second wheels; and at least one spring on the support frame for biasing the first and second wheels and the coulter blade in a direction toward the debris located on the soil;

whereby, as the assembly is moved along the soil, the first and second fingered wheels rotate to grab the debris and force the debris against the soil surface where the cutting edge of the coulter blade cuts the debris and the wheels force at least some of the cut debris outward away from the coulter blade; and an attachment member for connecting said assembly to a seed planter device for planting seed in the ground so that said assembly moves alternately toward and away from the ground and follows the contour of the ground independently of said seed planter device.

12. An apparatus as claimed in claim 11, wherein the first and second fingered wheels are angled toward each other to form the apex of said V and are closer together at the front of the coulter blade than at the rear of the coulter blade.

13. An apparatus as claimed in claim 11, wherein the support frame comprises a parallel bar linkage which includes a first channel member for being secured to a tool bar, an upper link member secured to a top of the channel member, a lower link member secured to a bottom of the channel member, and a mounting bar secured to the upper link member and lower link member so as to be substantially parallel to the first channel member, wherein the upper link member, the lower link member, and the mounting bar are movable together in a vertical direction relative to the first channel member.

14. An apparatus as claimed in claim 13, wherein the wheels and the coulter blade are secured to the mounting bar and are movable toward or away from the soil along with the mounting bar.

15. An apparatus as claimed in claim 11, wherein the springs for biasing the rotatable wheels and coulter blade toward the soil are adjustable for applying a pre-selected biasing force to the wheels and the coulter blade.

16. An apparatus as claimed in claim 11, wherein the coulter blade is provided with a depth band which contacts and follows the surface of the soil to control the depth that the coulter blade penetrates the soil.

17. An apparatus as claimed in claim 11, further comprising a tillage apparatus attached to and following the debris manipulating and clearing assembly, and a planting device attached to and following the tillage apparatus.

18. A process for manipulating and clearing crop residue from a zone of soil before tilling the soil to form a seedbed, the process comprising the steps of:

providing an agricultural apparatus, said agricultural apparatus comprising a support frame for being secured to a tool bar of a farm implement;

a pair of rotatable ground-driven wheels mounted on the frame and movable in a substantially vertical direction relative to the frame, the rotatable wheels being mounted on the frame in an angled orientation with the wheels converging toward each other adjacent the ground for manipulating crop residue in an area located between the pair of rotatable wheels, each of said wheels having a plurality of fingers disposed about the periphery of the wheel for manipulating the residue in said area; and a rotatable coulter blade mounted on the frame and movable in a substantially vertical direction relative to the frame, the coulter blade having a cutting edge disposed between the pair of rotatable wheels for cutting the residue that is manipulated by the pair of rotatable wheels in said area into separate portions;

whereby at least some of the separate residue portions are thrown outward away from the coulter blade to remove at least some of the residue from said area as the assembly moves along the soil; and an attachment member for connecting said assembly to a seed planter device for planting seed in the ground so that said assembly moves alternately toward and away from the ground and follows the contour of the ground independently of said seed planting device;

manipulating crop residue present on the surface of the soil located in a zone of soil with said agricultural apparatus and pressing the residue taut against the surface of the soil in the zone with said agricultural apparatus;

cutting the residue substantially simultaneously as it is pressed against the surface of the soil of the zone by wheels of said agricultural apparatus to form several portions of residue; and throwing at least some of the portions of cut residue outward with said agricultural apparatus to clear at least some of the residue from the zone of soil which will be formed into a seedbed.

19. A process as claimed in claim 18 wherein said agricultural apparatus includes said seed planter device and a tilling apparatus, the process further comprising the steps of:

tilling the soil located in the zone with said tilling apparatus substantially immediately after throwing the cut portions of residue outward to form a seedbed which does not have an excessive amount of crop residue mixed therein;

applying fertilizer to the zone of tilled soil to form a fertilized seedbed; and placing seed in the fertilized seedbed with said seed planter device substantially immediately after tilling and fertilizing the zone of soil to form a fertilized seedbed;

wherein the steps of clearing at least some of the residue from the zone of soil, tilling and fertilizing the zone of soil to form a fertilized seedbed, and placing seed in the seedbed are performed in a single pass over the soil.

* * * * *